United States Patent
Rose et al.

(10) Patent No.: US 7,406,585 B2
(45) Date of Patent: Jul. 29, 2008

(54) DATA PROCESSING SYSTEM HAVING AN EXTERNAL INSTRUCTION SET AND AN INTERNAL INSTRUCTION SET

(75) Inventors: Andrew Christopher Rose, Cambridge (GB); Krisztian Flautner, Cambridge (GB)

(73) Assignee: ARM Limited, Cambridge (GB)

( * ) Notice: Subject to any disclaimer, the term of this patent is extended or adjusted under 35 U.S.C. 154(b) by 359 days.

(21) Appl. No.: 10/609,538

(22) Filed: Jul. 1, 2003

(65) Prior Publication Data

US 2004/0059897 A1 Mar. 25, 2004

(30) Foreign Application Priority Data

Sep. 20, 2002 (GB) .................... 0221916.0

(51) Int. Cl.
G06F 9/30 (2006.01)
(52) U.S. Cl. ................................ 712/205
(58) Field of Classification Search ............ 712/205
See application file for complete search history.

(56) References Cited

U.S. PATENT DOCUMENTS

| | | | |
|---|---|---|---|
| 5,249,286 A * | 9/1993 | Alpert et al. | 711/125 |
| 5,481,751 A * | 1/1996 | Alpert et al. | 712/213 |
| 5,742,802 A | 4/1998 | Harter et al. | |
| 6,012,125 A * | 1/2000 | Tran | 711/125 |
| 6,216,206 B1 * | 4/2001 | Peled et al. | 711/133 |
| 6,223,254 B1 * | 4/2001 | Soni | 711/125 |
| 6,233,678 B1 * | 5/2001 | Bala | 712/240 |
| 6,363,336 B1 | 3/2002 | Banning et al. | |
| 2002/0066081 A1 | 5/2002 | Duesterwald et al. | |

FOREIGN PATENT DOCUMENTS

| | | |
|---|---|---|
| EP | 0716375 A2 | 6/1996 |
| EP | 0930572 A2 | 7/1999 |
| EP | 1039374 A2 | 2/2000 |
| EP | 1006438 A1 | 6/2000 |
| EP | 1 313 008 | 5/2003 |
| GB | 2 374 698 | 10/2002 |
| GB | 2 397 918 | 8/2004 |
| WO | 98/00779 | 1/1998 |

OTHER PUBLICATIONS

"The Block-based Trace Cache"; Black et al.; 1999; IEEE.*
"Micro-Operation Cache: A Power Aware Frontend for Variable Instruction Length ISA"; Solomon et al.; 2001; ACM.*
"Computer Architecture: A Quantitative Approach"; Third Edition; Hennessy et al.; May 2002.*
B. Cmelik et al, "Shade: A Fast Instruction-Set Simulator for Execution Profiling" Performance Evaluation Review, Association for Computing Machinery, vol. 22, No. 1, May 1994, pp. 128-137.

* cited by examiner

*Primary Examiner*—Tonia L. M. Dollinger
*Assistant Examiner*—Benjamin Geib
(74) *Attorney, Agent, or Firm*—Nixon & Vanderhye P.C.

(57) ABSTRACT

There is provided a system having an execution core operable to execute internal instructions.

A translation buffer is operable to store a plurality of internal instruction blocks of one or more internal instructions where the internal instruction blocks are a dynamic translation of respective external instruction blocks of one or more external instructions.

A remapper is responsive to an execution request for an external instruction that is within one of said external instruction blocks to identify a corresponding internal instruction block stored within said translation buffer. Thus one or more internal instructions from said corresponding internal instruction block can be supplied to execution core.

58 Claims, 2 Drawing Sheets

Figure 1.

Original control flow   Translated control flow

DATA PROCESSING SYSTEM HAVING AN EXTERNAL INSTRUCTION SET AND AN INTERNAL INSTRUCTION SET

BACKGROUND OF THE INVENTION

1. Field of the Invention

This invention relates to a data processing system having an external instruction set and an internal instruction set, for example to such systems having instruction cache memories, particularly using a memory structure combined with a software or hardware translator to decouple the externally visible instruction sets of a processor from the internally implemented instruction sets.

2. Description of the Prior Art

It is known from U.S. Pat. No. 6,332,215 to provide a system in which external Java bytecodes are translated into internal native processor instructions by instruction translation hardware.

It is known from the trace cache mechanisms of the Pentium IV processors produced by Intel Corporation to store data representing the previous execution path through a set of basic blocks of computer code such that a speculative trace may be easily fetched without having to individually fetch its constituent basic blocks as a measure to increase processing speed within a deeply pipelined system. The trace information is stored in a conventional cache using fixed-sized lines with pointers in the tags to specify the speculative trace structure. As will be seen, the present invention is not built on top of a traditional cache structure; it implements a temporal cache consisting of variable sized blocks on top of a standard RAM structure, which facilitates greater space efficiency and faster operation.

It is known in the microprocessors produced by Transmeta to provide a system in which software is used to translate from a non-native instruction set into a native instruction set and then manage that translation for execution upon the processor.

It is known to provide microprocessors which support multiple external instruction sets. An example of these are ARM architecture microprocessors which currently support three external instruction sets, namely the ARM, Thumb and Java instruction sets. Whilst it is desirable to be able to extend the number of different instruction sets supported by a particular microprocessor, a multiplicity of instruction sets tends to introduce extra complexity in the decoder, which in turn can adversely impact the performance and power consumption of the processor.

SUMMARY OF THE INVENTION

Viewed from one aspect the present invention provides apparatus for processing data, said apparatus comprising:
  (i) an execution core operable to execute internal instructions;
  (ii) a translation buffer operable to store a plurality of internal instruction blocks of one or more internal instructions, said internal instruction blocks being a dynamic translation of respective external instruction blocks of one or more external instructions;
  (iii) a remapper responsive to an execution request for an external instruction block to identify a corresponding internal instruction block stored within said translation buffer such that one or more internal instructions from said corresponding internal instruction block can be supplied to said execution core.

The remapper contains an exact mapping of previously encountered external block start addresses to their corresponding internal addresses in the translation buffer. A block is related but not limited to what is commonly known as a basic block. A block usually starts at an instruction that is a target of one or more branch instructions and is usually terminated by a branch instruction or some prespecified limit on the block size. However, as will be seen, in some cases a block may continue a set of instructions that include instructions from possibly multiple basic blocks and not necessarily in original program order.

The invention recognises that the adverse impact upon performance and power consumption of the processor involved in translating from one instruction set to another instruction set can be effectively amortised by the use of a translation buffer in which blocks of internal instructions which are dynamically formed translations of corresponding blocks of external instructions are stored such that they may be directly reused without requiring a further translation when that same portion of the computer program concerned is to be executed. Many real life computer programs repeatedly execute the same small portions of computer code and accordingly once this computer code has been translated, that translation may be reused without the performance overhead and power consumption overhead associated with another translation.

Whilst it is possible that execution requests to external instructions may be to other than the first instruction within an external instruction block it is strongly preferred to store as few overlapping translations as possible in order to save memory and accordingly, the execution request should be to a first external instruction within an external instruction block with internal instructions from the corresponding internal instruction block being supplied to the execution core starting with a first internal instruction from the internal instruction block.

Whilst it may be possible to produce embodiments which do otherwise, it is strongly preferred that the internal instruction blocks are functionally equivalent to respective corresponding external instruction blocks, in that they provide at least the functionality specified by the external instruction blocks.

The flexibility and efficient use of memory storage resources are improved when the external instruction blocks and/or the internal instruction blocks are of a variable length.

The invention is particularly well suited to systems in which the external instructions and the internal instructions are both part of external accessible instruction sets.

A preferred way of delimiting external instruction blocks is to arrange that external instruction blocks are terminated with a branch external instruction. This type of delimitation matches well the jumps of program flow within real life program execution.

Whilst it is possible that not all internal instruction blocks may be terminated with branch instructions, such as in the case of a single external instruction block being translated into multiple internal frames of instructions, preferably, when the external instruction blocks are delimited with branch external instructions, then the corresponding internal instruction blocks are preferably also terminated with branch internal instructions. Internal instruction blocks may have a maximum size resulting in not all internal instruction blocks terminating with a branch.

In order to facilitate the rapid mapping of external instruction blocks to internal instruction blocks, the remapper preferably stores mapping data identifying the required mapping and pointing to an address of a corresponding internal instruction block within the translation buffer.

The management of the memory resources dedicated to the translation is preferably achieved by dividing the translation buffer into different portions, using one such portion as a currently active portion into which newly generated mapping data and translated internal instructions are written until free space is not available within the current portion at which a previously filled portion and associated remapper portion is then cleared and newly generated data directed to that newly cleared portion.

A preferred technique for selecting the different portions of the memory resources to be used is a round robin algorithm.

The translation buffer may advantageously store further information regarding the internal instruction blocks, more particularly external instruction boundary control data specifying whether a particular internal instruction corresponds to a boundary between external instructions so as to facilitate interrupt and exception handling and the like. Instruction inter dependence control data which may be used to control parallel execution, early termination control data useful when handling interrupts, branch prediction data, useful in speeding up processing, next block data pointing to a particular next internal instruction block predicted to be used and code profiling data useful for the statistical analysis of the code being executed. It is possible, but not essential, for external instruction addresses to be stored in the internal instruction blocks, or alternatively the external PC value can be reconstructed at run-time by incrementing a counter whenever an external instruction boundary bit is seen in the internal instruction block.

In preferred embodiments of the invention the overall system performance may be improved by providing updating mechanisms operable to update the data stored within the translation buffer in response to detected execution behaviour. Thus, once the translation has been dynamically formed it may be fine tuned by a feedback mechanism which updates information such as the branch predictions and the like in dependence upon observed behaviour.

The instruction translation which is stored in the translation buffer may be achieved in a variety of ways, such as a hardware translator in the context of relatively simple and reasonably closely matched instruction sets or under software control for more complex or less closely matched instruction sets.

The instruction translator may preferably be responsive to run-time information to produce resolved internal instructions, e.g. resolved memory addresses, inline exception handlers, mode transitions and simplified computation (e.g. inlined values such as the PC as an immediate operand within internal instructions).

Overall system performance may be improved, particularly the ability to deal with interrupts and the like, by providing a lockdown area within the translation buffer into which internal instruction blocks may be placed and locked down so as to be permanently available for rapid use should they be required. The lockdown area may be of variable length.

Preferred embodiments of the invention also recognise that once a translation has been made, when it is evicted from the translation buffer it may still advantageously be used by holding it at least temporarily within a rescue memory, which may be slower than the translation buffer, but will nevertheless be more rapid and efficient than having to redo the translation from scratch. It is also possible to opportunistically move data into the rescue memory for which it is determined that it will soon be evicted but will be useful in the future.

Dividing the program being executed into internal instruction blocks advantageously facilitates speculative execution whereby instruction blocks identified within the program flow may be speculatively executed ahead of time such that their results may be rapidly available if the program flow does in fact reach them.

As an example, one or more external instruction blocks may be speculatively taken and identified as good candidates for speculative scheduling because, for example, there are many pipeline stalls during their execution and exception conditions haven't been observed during previous runs. These blocks can then be translated (using the translator/decoder or some other hardware or software) into a set of speculative internal blocks. If when executing speculative blocks a misspeculation is detected, then the speculative state is fixed up to be consistent with the nonspeculative state and perhaps requiring instructions to be re-executed in non-speculative order. Speculative execution of internal instruction blocks may advantageously be performed in some circumstances without knowing at the outset the external PC value.

In preferred embodiments, special provision may be made for exceptions. An exception may be considered as a branch that is not statically encoded in the program. One way of handling exceptions is to do a translation of the exception handler (which might already be translated), execute it and then retranslate a new internal block from the instruction that caused the exception to the next branch instruction and resume execution. This is likely to cause extra duplication in the translation buffer. To avoid re-translation, preferred embodiments may add some bits to the return address stack that specify the internal PC where the exception was taken and then allow the micro-architecture to resume execution in the middle of an internal block. It is significant that the micro-architectural detail of the internal and external PCs is not necessarily exposed to the architecture. The return pointer is not necessarily an extension of the return address stack.

The above considerations also apply to interrupts: in order to handle interrupts in the middle of internal blocks, the system may do the above to avoid re-translations of the block where the interrupt occurred.

A further preferred feature is that blocks may be put into different portions in the remapper (and associated translation buffer portion) based on some extra criteria. For example, kernel code may be put in some specific ranges, entry points to locked-down code into another, translations that are unlikely to be needed (such as interrupt and exception re-entry blocks) in another, etc.

With respect to lock-down, the code to be locked down can go through an additional pre-processing step by for example, using a piece of software much like a linker/loader to eliminate unnecessary lookups in the remapper. This technique works by having access to the entire code image before it is put into the translation buffer and then having the ability to relocate the program directly into the translation buffer's memory space. Branches whose targets are in the locked down code can be turned into special internal branch instructions that branch directly to a location in the translation buffer without having to go through a lookup in the remapper. That way, there may only be a need to store external entry points to the locked down region in the remapper (e.g. the mapping of the interrupt vector from external to internal address). This makes the lockdown more flexible and more deterministic, which is important for fast interrupt handling.

A further preferred feature is that the translation buffer can be mapped into an area of physical memory so that in certain modes, the core can address it just like any other memory in the system. This is useful for example in the above mentioned circumstances where the interrupt handler could be addressed directly, without ever having to go through the remapper. It is also useful for software translators that need a way of putting data into the translation buffer.

A further preferred feature provides special internal branch instructions that bypass the remapper and others that do translation cache-specific operations (testing the remapper, managing entries, etc.) These instructions can only be used in a privileged mode of the system.

Viewed from another aspect the present invention provides a method of processing data, said method comprising:
(i) storing within a translation buffer a plurality of internal instruction blocks of one or more internal instructions, said internal instruction blocks being a dynamic translation of respective external instruction blocks of one or more external instructions;
(ii) in response to an execution request for an external instruction that is within one of said external instruction blocks, identifying a corresponding internal instruction block stored within said translation buffer; and
(iii) supplying one or more internal instructions from said corresponding internal instruction block to an execution core operable to execute internal instructions.

The translation can be performed opportunistically in response to instruction prefetching.

The above, and other objects, features and advantages of this invention will be apparent from the following detailed description of illustrative embodiments which is to be read in connection with the accompanying drawings.

DESCRIPTION OF THE PREFERRED EMBODIMENTS

The ARM architecture currently supports three external instruction sets: ARM, Thumb, and Java. However, the multiplicity of instruction sets introduces extra complexity in the decoder, which in turn can adversely impact the performance and power consumption of the processor. A way of dealing with this problem is by amortising the decode cost using the translation cache.

As its name implies, the translation cache caches translations, not necessarily the original instructions. On a cache miss, a basic block of external instructions is fetched from the memory system and their instructions are translated into the internal (native) instruction set of the core. The number of instructions in the externally visible basic block need not be the same as the internal representation, which gives flexibility to the microarchitecture implementation to decide which instructions are directly supported in hardware. Moreover, the layout of the internal instructions can be designed to be easily decodable in the pipeline and can also include extra information to help execution. For example, the translator can figure out whether two adjacent instructions are independent or not and mark them as such in the translation cache. When these instructions are issued, the core needs only look at the independence bit for this information, instead of having to perform register comparisons between the candidate instructions. Further information, such external instruction boundary, allowability of early termination, etc, may also be stored with the translation.

Figure 1:
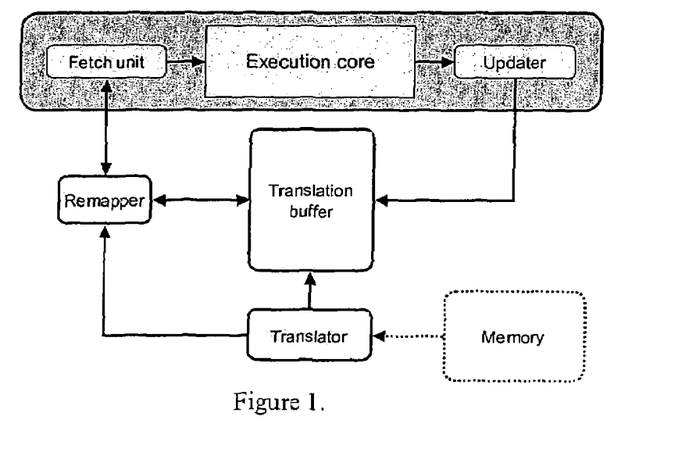
FIG. 1 schematically illustrates a high level view of a translation cache architecture.

FIG. 1 shows the abstract architecture of the translation cache. Its five main components are the translator, translation buffer, remapper, fetch unit, and the updater. The translator converts the external instructions into the internal representation and allocates a frame of storage in the translation buffer. It also puts a mapping between the basic block's and its translation's start addresses into the remapper. The unit of operation for the translator is the basic block, which gets translated into one or more variable-sized frames of internal instructions. In addition to the translated code, a frame—among other things—may contain branch prediction and statistical information (which may be dynamically updated at runtime). The translation buffer in this example embodiment is a large on-chip memory array which stores translated frames. Depending on implementation it may be implemented as a cache that caches a larger piece of external memory, however currently preferred implementations are an independent on-chip memory. The fetch buffer is the "glue" between the translation mechanisms and the execution core. During execution it keeps a copy of the currently executing frame so that sequential instructions can be supplied to the core in a straight-forward way. When a branch instruction is encountered, the fetch unit forwards the address to the remapper. If there is a mapping of the target address, then the new frame can be loaded directly from the translation buffer, otherwise the translator must be invoked first to generate a new frame. Depending on the sophistication of the fetch unit, it may also include various branch predictors and prefetch mechanisms to amortise the translation cost and to reduce the branch penalty. The updater is located at the end of the execution pipeline and its main task is to update information (such as branch prediction information) associated with the last frame that finished execution. Design trade-offs related to the translation cache organisation are explored in the following sections.

Figure 2:
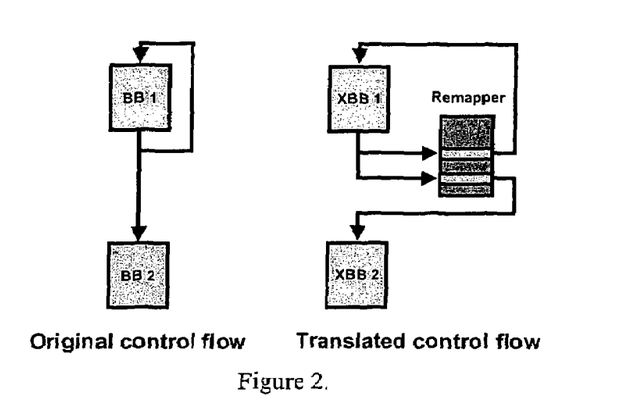
FIG. 2 schematically illustrates the role of the remapper in influencing the control flow within program execution.

There are two key issues regarding the translation buffer: the way a translation is found and how space is reclaimed for new translations. Both of these issues are addressed by the use and organisation of the remapper. The remapper is accessed at the end of the execution of each frame to find the index (in the translation buffer) of the next frame based on its external address. FIG. 2 shows the control flow between two original basic blocks (BB1 and BB2) and between their corresponding translated frames (XBB1 and XBB2). In the general case, the translator cannot statically determine which frame the branch's destination address will map to and thus the translation's address must be looked up in the remapper. This implies the following:

The remapper's size and associativity puts an upper bound on the number of frames that can be live (i.e. accessible) in the translation buffer.

Valid translations may become inaccessible due to conflict misses in the remapper.

To invalidate a frame, one must remove its corresponding entry in the remapper. Conceptually, this involves a reverse mapping from the translation's index to the block's external address.

Another related issue is that while the ends of the basic blocks are marked clearly in the instruction stream by the presence of a branch instruction, the entrypoints of the basic blocks are not explicit: branches may have a target in the middle of a set of consecutive instructions, which are not explicitly marked in the ISA. This means that translating the external instruction stream into an internal one can lead to some duplication when a new block is encountered, which has already been partially translated. There are two principal ways of reducing duplication:

During the translation process, for each instruction, check whether it has already been mapped in the remapper and finish the frame if there is a hit. This technique will avoid duplication if the smaller subset of a larger block was encountered first by the translator, however it will not prevent duplication if the larger block was executed first.

Keeping a mapping from external basic block end addresses to their index in the translation buffer. This structure is similar to the remapper but indexed by the end of the basic block, instead of the beginning. Before putting a new frame into the translation buffer, this structure is checked to see if there exists a translation with the same endpoint. If there is, then the overlaps of the new and old translations must be reconciled appropriately and updated in the relevant structure.

While there are ways of reducing duplication, it is not clear that it is a problem that needs solving. Having more instructions in a block is beneficial for performance, since it increases the number of sequential instructions between branches. Moreover, the cost of detecting duplication may be larger than the potential space savings.

A simple policy for buffer reuse is that if there is no more space left in the buffer, then the remapper is cleared and all translations are removed. The size of the remapper is chosen by considering the number of frames that can be put into the translation buffer, their average size and the number of bits required to address the translation buffer. As an example, it may be assumed that the translations will contain the same number of instructions as in the external program, that there are on average about four instructions in a basic block and that the translation buffer can be addressed with less than 16 bits. This implies that for a 32K translation buffer, one needs 2048 index entries which translates into a 4K remapper size.

There will be a fraction of allocated space in the translation buffer that cannot be accessed through the remapper. This situation arises as a result of a conflict miss in the remapper. The primary way of dealing with this problem is by increasing its associativity. Preferably, the remapper needs to be at least 4-way associative but higher degrees of associativity have a positive payoff.

A fraction of bytes will have been translated multiple times as a result of multiple entrypoints to a block. Whilst multiple translations waste space in the translation buffer, the mechanisms required to reduce duplication are also costly (both in terms of memory and control complexity). For example, as described above, duplication can be detected by keeping a mapping of block end addresses to their associated frame translation buffer size. Since duplication accounts for only about 5%, this solution would not be space effective. In cases where useful buffer utilisation is of high importance, the simpler technique of only translating instructions whose addresses are not mapped by the remapper could be used to reduce duplication. However, the added translation complexity, as well as the frequent remapper access, could adversely impact the translation time.

A simple technique of clearing the entire translation buffer after it filled up may be used. While suboptimal, this technique works well for relatively small workloads and translation buffer sizes and simplifies the synchronisation of the data in the translation buffer and corresponding entries in the remapper. To improve on this technique the main issue is that whenever a range of frames are evicted from the translation buffer, the corresponding entries need to be removed from the remapper. A straight forward way of accomplishing this is by walking through all the frames before eviction, looking them up in the remapper, and then invalidating their entries. Moreover to be able to allocate new frames into the translation buffer, the existing space may need to be defragmented. This is a sequential and relatively slow process which can significantly increase the miss penalty.

Figure 3:
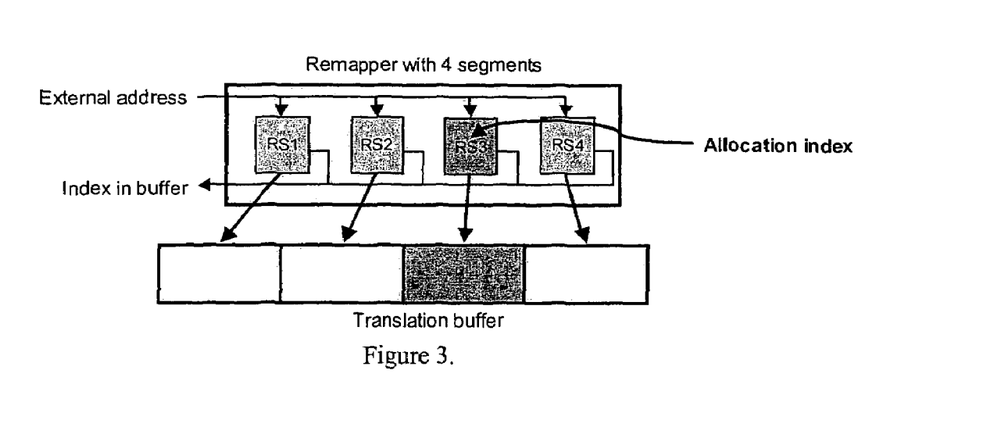
FIG. 3 schematically illustrates segmented storage within a remapper.

FIG. 3 illustrates the segmented remapper, which facilitates faster and simpler space reclamation. The translation buffer is divided into segments with corresponding segments in the remapper, that are allocated and freed together. As long as the frame index is below a certain watermark, frames are put into the remapper segment referred to by the allocation index. If the frame's index exceeds the threshold, allocation moves onto a new remapper segment. If that segment already contains valid mappings, then it is cleared first. Clearing is accomplished quickly by invalidating all the lines in the remapper segment concurrently and the watermark is set to the end of the next buffer range in the translation buffer. Preferably, the remapper segment with the smallest working set of active remapper addresses would be selected for reuse. However, in practice a round-robin reuse policy works very well, which has the added benefit of simple implementation. While new mappings are allocated into a single segment at a time, addresses are looked up in all segments in parallel. However, due to the allocation policy, at most a single segment is guaranteed to contain the data.

While the segmented remapper simplifies the buffer reuse, it has other costs associated with it. By making multiple small caches out of a single big cache, the size of the tag storage goes up and conflict misses may increase in individual segments. Experimentation shows that even on small benchmarks the benefits of segmentation are apparent in the resulting reduced memory traffic as a result of the reduced number of discarded useful translations. On the other hand, the memory traffic may increase resulting from the extra contention in individual segments. This problem can be alleviated by increasing the associativity or the number of segments in the remapper. This works because with more segments the same number of entries are now responsible for keeping mappings for a smaller range in the buffer. Increasing the number of segments is a viable alternative to increasing the degree of associativity within each segment.

A significant advantage of the translation cache is that it can amortise the decode cost. However, this benefit may be muted if the overhead of looking up a translation in the cache is significantly lengthened. The principal components of the overhead is the extra access through the remapper each time a branch is encountered. Conceptually, the following steps need to take place for each branch:

Branch target address computation.
Virtual to physical address mapping of the branch target (TLB lookup)
Remapper lookup to find the translated frame in the cache.
Translation cache access.
Frame alignment.

A conservative design would allow 2 to 3 cycles for these steps, however incurring this overhead on each branch instruction would severely limit the processor's performance. The principal ways of dealing with this problem are by speculatively prefetching frames and by reducing the frame lookup cost by caching remapped frame indices.

Since the core executes instructions from a different location-from the translation buffer-than the original location of the program, the role of the program counter (PC) needs to be clarified. Conceptually, in addition to the PC that sequences through the original program, there needs to be an internal PC-not necessarily architecturally visible, which sequences through the translated instructions. For exception and branch semantics to work correctly, these two program counters must be kept synchronized. One way of accomplishing this is by keeping a bit of information with internal instructions that specifies if that instruction is an external instruction boundary or not. Whenever an internal instruction is executed whose external instruction boundary bit is set, the external PC is incremented.

Figure 4:
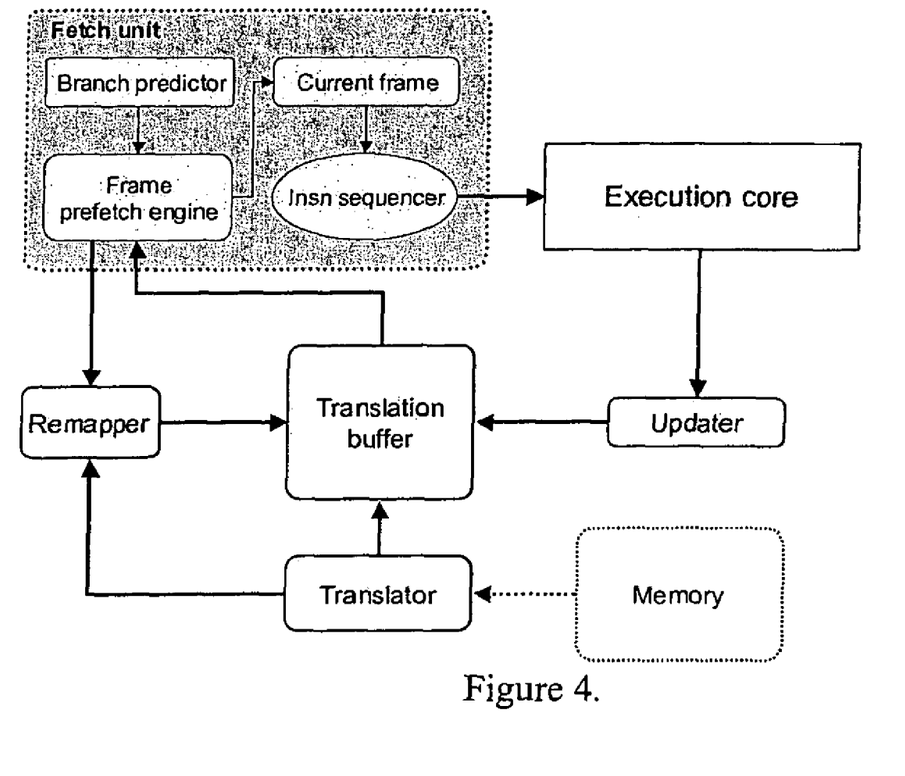
FIG. 4 schematically illustrates the fetch unit within a processor using a translation cache as described in relation to the above mentioned drawings.

FIG. 4 provides a more detailed view of an example of a fetch unit and of its interaction with the rest of the processor. The currently executing frame is kept in a small buffer, out of which the instruction sequencer sends individual instructions (or groups of instructions) to the execution core. In parallel with execution, the branch predictor speculatively prefetches the frames into a prefetch buffer and promotes them to the currently executing slot as needed.

An important aspect of the translation cache is that information can be uniquely associated with each basic block. One way the fetch unit can take advantage of this storage is by keeping the branch prediction information (two bit counters, and/or history information) and the indices of the following basic blocks in the frame header (branch target) and thus eliminating aliasing between the data used for predictions. The former technique reduces aliasing between predictions, while the latter reduces the number of times the remapper needs to be accessed. A simple branch prediction strategy, where 1 or 2 bits of state are used for branch prediction, may be used along with the cached indices of the predicted next frame as well as the index of the last mispredicted frame. In this framework one bit of state selects which one of the two frames will be executed next, the second bit is used to control when the prediction should be switched between the two frames. The amount of state used by this strategy can be reduced by keeping only the predicted frame index in the header and increasing the misprediction latency by a remapper lookup. Once a frame has been fetched, prefetches to subsequent frames can be initiated immediately, since the prediction of the next frame is known immediately when a frame starts executing. In tests the average number of instructions in each frame, even on a dual-issue processor, are such that one could afford even as much as 2-3 cycles for a prefetch to complete without stalling the pipeline.

Since, the internal and externally visible ISAs may be different, care must be taken to expose a consistent machine state whenever an exception occurs. This means that if a single external instruction was mapped into multiple internal instructions, then the exception should only be taken on external-instruction boundaries. One solution to this problem is to keep an extra bit in the translation cache for each instruction that marks external instruction boundaries. The extra necessary bits could either be stored in the frame header or as tags on each word of the translation buffer.

An important difference between exceptions and interrupts are that exceptions are generated internally, while interrupts are generated by an external source. To handle exceptions, execution must be rolled back to the last external-instruction boundary, while interrupts may be handled after the current instruction has finished executing. To preserve good interrupt latency, this implies that the translation between external and internal instructions must be close to one-to-one. A class of long-latency but restartable instructions could be defined to facilitate large translations. However, even in the second case, it is important to be able to guarantee forward progress.

Another issue for the translation cache, is how execution resumes after the interrupt or exception handler. The problem is that normally the control flow changes only on frame boundaries, the requirement of which cannot be imposed on all exceptions. The simple way of handling exception returns is to create a new entry point and to generate a new frame starting at that address. However, this strategy can significantly increase the amount of wasted space in the translation buffer, since its unlikely that the new entrypoint will be accessed again (since interrupts are external, essentially random events with respect to the PC). A better strategy is to augment the branch predictor's return address stack with extra information that can resume execution at any instruction within a frame. The processor can resort to full translation in case of a miss on the return-address stack.

The main mode of use of the translation cache is to remap consecutive instructions of the external basic block to a corresponding set of consecutive instructions in the translated frame. To preserve exact exception semantics and to facilitate single-step debugging, the internal and external order of the instructions must be the same. The principal task of the translator is to remap the instructions and to simplify the decode (a proposal for performing dynamic scheduling is described below). One of the important requirements for the translator is the availability of a few extra scratch registers to hold intermediate values between translated instructions. When an external instruction maps to multiple internal instructions, the communication between the translated instructions should not pollute the architected state with partial results—there needs to be a way to roll back to a consistent state if an exception is encountered.

The translation cache may also serve as a decoded instruction cache, which keeps additional bits of information to simplify the task of the decoder on the critical path. For example, the ordering of the bit-fields and their meanings can be changed internally, or independence between consecutive instructions can be explicitly marked so that register comparisons do not need to take place in the execution pipeline.

While most of the translation and decode operations are handled by the translation unit, which is implemented in hardware, complex decode can also take place in software. Upon encountering a complex instruction, the translation unit can throw an exception which causes the invocation of a translation-exception handler on the core. Note that unless translations are fetched speculatively, or the execution pipeline is out-of-order, there should be nothing executing on the core pipeline concurrently with the translator. Java translation is a prime candidate for handling in software.

The performance of the translation cache depends in large part on how close the external and internal instruction sets are semantically. However, the internal instructions need to be able to address a larger register space than what is available externally, and operating mode changes need to be eliminated.

While for most basic blocks, there is a one-to-one correspondence between external and internal instructions, with a few simple modifications the in-order core can take advantage of the benefits of out-of-order execution. The idea is the following:

The microarchitecture monitors the execution and marks frames that have a significant fraction of pipeline-stalls associated with them.

If a problem frame follows the execution of a specific other frame(s) with high probability, and there is a low incidence of exceptions during execution, then the marked set of frames are selected for trace scheduling.

Rescheduling takes place in the translation unit, concurrently with execution.

Once the speculative frame(s) have been generated, the address of the new frame is put as the predicted target address of the preceding frame.

Misspeculations are handled just as exceptions: the speculative state is blown away and execution restarts from the last known good non-speculative state.

It is easy to recover the architected register state after misspeculation, since speculative register writes are handled in a separate register range. However, there is no separate memory area for speculative memory accesses, thus care must be taken so that speculative memory writes do not reach physical memory. This can be accomplished with the use of a load-store queue, which only writes its data to a main memory in non-speculative mode.

Lockdown areas of translation may also be used for code such as OS kernel, interrupt/exception handlers and the like for which fast and consistent execution is required.

A rescue memory may be provided into which translations determined to be likely to be needed again (e.g. they are frequently executed) may be transferred before being evicted from the main translation buffer.

The translator may be operable to pre-process the translations so as to resolve memory addresses and to inline exception handlers, remove mode transitions and otherwise simplify computation based on run-time information.

Privileged mode instructions may be provided for translation system management, such as remapper bypassing branch instructions and remapper management instructions.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data, said apparatus comprising:
   (i) an execution core for executing internal instructions;
   (ii) a translation buffer for storing a plurality of internal instruction blocks of one or more internal instructions, said internal instruction blocks comprising a dynamic translation of respective external instruction blocks of one or more external instructions;
   (iii) a remapper, responsive to an execution request for an external instruction that is within one of said external instruction blocks, for identifying a corresponding internal instruction block stored within said translation buffer and for supplying one or more internal instructions from said corresponding internal instruction block to said execution core, said remapper for storing in a remapper memory mapping data identifying a mapping between an address of an external instruction block and an address of a corresponding internal instruction block within said translation buffer; and said remapper memory is divided into a plurality of remapper memory portions each memory portion associated with a respective translation buffer portion within said translation buffer and at least one of said remapper memory portions stores a plurality of mappings comprising at least one mapping for an external instruction block comprising a plurality of external instructions, only one of said remapper memory portions receives newly generated mapping data until said associated translation buffer portion no longer has free space to accept newly generated internal instruction blocks whereupon another of said remapper memory portions is selected and cleared and newly generated mapping data is stored therein with newly generated internal instruction blocks being stored in an associated translation buffer portion.

2. Apparatus as claimed in claim 1, wherein said execution request is to a first external instruction within an external instruction block and internal instructions from said corresponding internal instruction block are supplied to said execution core starting with a first internal instruction from said corresponding internal instruction block.

3. Apparatus as claimed in claim 1, wherein internal instruction blocks are functionally equivalent to respective corresponding external instruction blocks.

4. Apparatus as claimed in claim 1, wherein said external instruction blocks are of variable length.

5. Apparatus as claimed in claim 1, wherein said internal instruction blocks are of variable length.

6. Apparatus as claimed in claim 1, wherein said internal instructions are part of an externally accessible instruction set.

7. Apparatus as claimed in claim 1, wherein external instruction blocks are terminated with a branch external instruction.

8. Apparatus as claimed in claim 1, wherein internal instruction blocks are terminated with a branch internal instruction.

9. Apparatus as claimed in claim 1, wherein said another of said remapper memory portions is selected using a round robin algorithm.

10. Apparatus as claimed in claim 1, wherein said translation buffer also stores external instruction boundary control data for each internal instruction within an internal instruction block specifying whether said internal instruction corresponds to a boundary between external instructions.

11. Apparatus as claimed in claim 1, wherein said translation buffer also stores instruction independence control data for each internal instruction within an internal instruction block specifying whether said internal instruction may be executed without dependence upon a preceding instruction within said internal instruction block.

12. Apparatus as claimed in claim 1, wherein said translation buffer also stores branch prediction data for an internal instruction block specifying a predicted branch target to be taken upon completion of execution of said internal instruction block.

13. Apparatus as claimed in claim 1, wherein said translation buffer also stores next block data for each internal instruction block specifying a location within said translation buffer of a predicted next internal instruction block to be executed.

14. Apparatus as claimed in claim 1, wherein said translation buffer also stores code profiling data for each an internal instruction block specifying statistics relating to execution of said internal instruction block.

15. Apparatus as claimed in claim 12, comprising an updater operable to update data stored within said translation buffer relating to a stored internal instruction block in response to detected execution behaviour.

16. Apparatus as claimed in claim 1, comprising an instruction translator operable to translate external instruction blocks into internal instruction blocks.

17. Apparatus as claimed in claim 16, wherein said instruction translator is one of:

(i) a hardware based instruction translator; and
(ii) a software based instruction translator.

18. Apparatus as claimed in claim 1, wherein said translation buffer includes a lock down area in which internal instruction blocks may be placed in lock down storage.

19. Apparatus as claimed in claim 1, comprising a rescue memory in which an internal instruction block previously stored in said translation buffer is at least temporarily stored and is available for access should a miss occur when seeking said internal instruction block within said translation buffer.

20. Apparatus as claimed in claim 1, wherein at least some internal instruction or internal instruction blocks are speculatively executed ahead of their position within program execution flow.

21. Apparatus as claimed in claim 16, wherein said instruction translator is responsive to run-time information available concerning said external instruction blocks when translating external instruction blocks into internal instruction blocks.

22. Apparatus as claimed in claim 21, wherein said instruction translator is operable to one or more of:
   (i) resolve memory addresses;
   (ii) resolve inline exception handlers;
   (iii) remove mode transitions; and
   (iv) simplify computation that relies on information that is constant or substantially constant at run-time.

23. Apparatus as claimed in claim 1, comprising an exception handler operable upon occurrence of an exception whilst executing an internal instruction of an internal instruction block to trigger execution of exception handling instructions and storage of an exception return pointer to enable execution of said internal instruction block to resume at a point at which said exception occurred.

24. Apparatus as claimed in claim 1, comprising an interrupt handler operable upon occurrence of an interrupt whilst executing an internal instruction of an internal instruction block to trigger execution of interrupt handling instructions and storage of an interrupt return pointer to enable execution of said internal instruction block to resume at a point at which said interrupt occurred.

25. Apparatus as claimed in claim 1, wherein said translation buffer has a plurality of portions assigned to store internal instruction blocks corresponding to different types of external instruction blocks.

26. Apparatus as claimed in claim 1, wherein said remapper memory has a plurality of portions assigned to store mapping data corresponding to a different type of external instruction block.

27. Apparatus as claimed in claim 18, wherein internal instruction blocks placed in lock-down storage are pre-processed to reduce lookups in said remapper.

28. Apparatus as claimed in claim 1, wherein said translation buffer is address mapped into an area of physical memory that may be accessed under program control.

29. Apparatus as claimed in claim 1, wherein one or more remapper managing internal instructions are operable to perform management operations upon said remapper.

30. A method of processing data, said method comprising:
   (i) storing within a translation buffer a plurality of internal instruction blocks of one or more internal instructions, said internal instruction blocks being a dynamic translation of respective external instruction blocks of one or more external instructions;
   (ii) in response to an execution request for an external instruction that is within one of said external instruction blocks, identifying a corresponding internal instruction block stored within said translation buffer;
   (iii) supplying one or more internal instructions from said corresponding internal instruction block to an execution core operable to execute internal instructions; and
   (iv) storing in a remapper memory, mapping data identifying a mapping between an address of an external instruction block and an address of a corresponding internal instruction block within said translation buffer, wherein said remapper memory is divided into a plurality of remapper memory portions each associated with a respective translation buffer portion within said translation buffer and at least one of said remapper memory portions stores a plurality of mappings comprising at least one mapping for an external instruction block comprising a plurality of external instructions, and wherein only one of said remapper memory portions serves to receive newly generated mapping data until said associated translation buffer portion no longer has free space to accept newly generated internal instruction blocks whereupon another of said remapper memory portions is selected and cleared and newly generated mapping data is stored therein with newly generated internal instruction blocks being stored in an associated translation buffer portion.

31. A method as claimed in claim 30, wherein said execution request is to a first external instruction within an external instruction block and internal instructions from said corresponding internal instruction block are supplied to said execution core starting with a first internal instruction from said corresponding internal instruction block.

32. A method as claimed in claim 30, wherein internal instruction blocks are functionally equivalent to respective corresponding external instruction blocks.

33. A method as claimed in claim 30, wherein said external instruction blocks are of variable length.

34. A method as claimed in claim 30, wherein said internal instruction blocks are of variable length.

35. A method as claimed in claim 30, wherein said internal instructions are part of an externally accessible instruction set.

36. A method as claimed in claim 30, wherein external instruction blocks are terminated with a branch external instruction.

37. A method as claimed in claim 30, wherein internal instruction blocks are terminated with a branch internal instruction.

38. A method as claimed in claim 30, wherein said another of said remapper memory portions is selected using a round robin algorithm.

39. A method as claimed in claim 30, wherein said translation buffer also stores external instruction boundary control data for each internal instruction within an internal instruction block specifying whether said internal instruction corresponds to a boundary between external instructions.

40. A method as claimed in claim 30, wherein said translation buffer also stores instruction independence control data for each internal instruction within an internal instruction block specifying whether said internal instruction may be executed without dependence upon a preceding instruction within said internal instruction block.

41. A method as claimed in claim 30, wherein said translation buffer also stores branch prediction data for an internal instruction block specifying a predicted branch target to be taken upon completion of execution of said internal instruction block.

42. A method as claimed in claim 30, wherein said translation buffer also stores next block data for each an internal instruction block specifying a location within said translation buffer of a predicted next internal instruction block to be executed.

43. A method as claimed in claim 30, wherein said translation buffer also stores code profiling data for each an internal instruction block specifying statistics relating to execution of said internal instruction block.

44. A method as claimed in claim 41, comprising updating data stored within said translation buffer relating to stored internal instruction block in response to detected execution behaviour.

45. A method as claimed in claim 30, comprising translating external instruction blocks into internal instruction blocks.

46. A method as claimed in claim 45, wherein said translation is one of:
 (i) performed by a hardware based instruction translator; and
 (ii) performed by a software based instruction translator.

47. A method as claimed in claim 30, wherein said translation buffer includes a lock down area in which internal instruction blocks may be placed in lock down storage.

48. A method as claimed in claim 30, wherein an internal instruction block previously stored in said translation buffer is at least temporarily stored within a rescue memory to be available for access should a miss occur when seeking said internal instruction block within said translation buffer.

49. A method as claimed in claim 30, wherein at least some internal instruction or internal instruction blocks are speculatively scheduled in a different order than in the external program flow.

50. A method as claimed in claim 30, wherein said translation is responsive to run-time information available concerning said external instruction blocks when translating external instruction blocks into internal instruction blocks.

51. A method as claimed in claim 50, wherein said translation is operable to one or more of:

(i) resolve memory addresses;
 (ii) resolve inline exception handlers;
 (iii) remove mode transitions; and
 (iv) simplify computation that relies on information available at run-time.

52. A method as claimed in claim 30, wherein upon occurrence of an exception whilst executing an internal instruction of an internal instruction block, execution of exception handling instructions is triggered and an exception return pointer is stored to enable execution of said internal instruction block to resume at a point at which said exception occurred.

53. A method as claimed in claim 30, wherein upon occurrence of an interrupt whilst executing an internal instruction of an internal instruction block, execution of interrupt handling instructions is triggered and an interrupt return pointer is stored to enable execution of said internal instruction block to resume at a point at which said interrupt occurred.

54. A method as claimed in claim 30, wherein said translation buffer has a plurality of portions assigned to store internal instruction blocks corresponding to different types of external instruction blocks.

55. A method as claimed in claim 30, wherein said remapper memory has a plurality of portions assigned to store mapping data corresponding to a different type of external instruction block.

56. A method as claimed in claim 47, wherein internal instruction blocks placed in lock-down storage are pre-processed to reduce lookups in said remapper.

57. A method as claimed in claim 30, wherein said translation buffer is address mapped into an area of physical memory that may be accessed under program control.

58. A method as claimed in claim 30, wherein one or more remapper managing internal instructions are operable to perform management operations upon said remapper.

* * * * *